United States Patent [19]
Umehara et al.

[11] Patent Number: 5,691,581
[45] Date of Patent: Nov. 25, 1997

[54] ARM ASSEMBLY AND VOICE COIL MOTOR

[75] Inventors: Teruo Umehara, Hanyu; Fumihiko Takahashi, Saitama-ken, both of Japan

[73] Assignees: Hitachi Metals, Ltd.; Hitachi Metals Kiko, Ltd., both of Tokyo, Japan

[21] Appl. No.: 492,546

[22] Filed: Jun. 20, 1995

[30] Foreign Application Priority Data

Jan. 6, 1995 [JP] Japan .......................... 7-562

[51] Int. Cl.⁶ .................. H02K 41/00; G11B 5/48
[52] U.S. Cl. .......................... 310/13; 360/104
[58] Field of Search ...................... 310/12, 13, 14; 360/104, 105, 106

[56] References Cited

U.S. PATENT DOCUMENTS 5,122,701  6/1992  Takahashi et al. ............... 310/36
5,168,184  12/1992  Umehara et al. ................ 310/13

Primary Examiner—Steven L. Stephan
Assistant Examiner—Judson H. Jones

[57] ABSTRACT

The arm assembly includes an arm member composed of a rotatable boss member; three or more arm plates each formed from a thin, non-magnetic metal sheet and extending in parallel from one side of the boss member; a coil member fixed to the other side of the boss member such that the coil member is swingable in a magnetic gap; and a suspension member having a front end equipped with a recording/reproducing head and a rear end fixed o a free end of each arm plate; wherein pins projecting from upper and lower surfaces of the boss member are fitted into through-holes of an uppermost arm plate and a lowermost arm plate so that the uppermost and lowermost arm plates are strongly fixed to the boss member, and wherein at least one arm plate disposed between the uppermost and lowermost arm plates is integrally fixed to the boss member with a thermoplastic resin.

12 Claims, 6 Drawing Sheets

ARM ASSEMBLY AND VOICE COIL MOTOR

BACKGROUND OF THE INVENTION

1. Background of the Invention

The present invention relates to a voice coil motor used for positioning a magnetic head on a desired track of a magnetic disk and an arm assembly incorporated in it.

2. Description of the Related Art

Conventionally, the positioning of a recording and reproducing head on a desired track of a magnetic disk in a magnetic disk drive is conducted by a voice coil motor. Among magnetic disk drives, those contained in laptop-type computers or notebook-type computers comprise magnetic disks of 3.5 inches or less. A voice coil motor used widely in such small-sized disk drives comprises a magnetic circuit means constituted by a pair of yokes opposing each other and a permanent magnet attached to at least one yoke, and a head arm (arm assembly) having a coil swingable in a magnetic gap defined on a surface of the permanent magnet by the yokes positioned with a support fixed therebetween.

The above-mentioned arm assembly comprises a boss member supported by a shaft mounted to a casing, a plurality of arm plates extending in parallel from one side of the boss member, a coil fixed to the other side of the boss member, and a suspension member fixed to a free end of each arm plate for supporting a head. The above-mentioned arm plates are usually produced by aluminum die-casting.

A conventional swing-type actuator is shown in FIGS. 8 and 9. An arm plate 5 formed from an aluminum alloy such as ADC12 by die casting has a hole 8a in a middle portion thereof, through which the arm plate 5 is swingably mounted to a hard disk drive. The arm plate 5 further has through-holes 8b for mounting a functioning member (not shown) such as a magnetic head on one end, and-a planar projection 5a ("dovetail-shaped projection") for preventing the detachment of other parts on the other side (on the side of a movable coil 6). As shown in FIG. 8, the planar projection 5a has a contour resembling a dovetail when viewed from above and having a through-hole 5b. A hold member 9, which is formed of a thermoplastic resin by injection molding, etc., encompasses a periphery of the movable coil 6 and the dovetail-shaped projection 5a. Accordingly, the thermoplastic resin of the hold member 9 enters into the through-hole 5b of the dovetail-shaped projection 5a, so that the movable coil 6 and the dovetail-shaped projection 5a are strongly fixed by means of the hold member 9.

There has been an increasingly higher demand for miniaturization and increased capacity in magnetic disk drives for the past several years. For example, in the case of a disk drive comprising a large number of 3.5-inch magnetic disks for a storage capacity of 3–4 G bytes, the disk drive should have a large number (for example, 10 or more) of magnetic heads in a head assembly. On the other hand, from the viewpoint of miniaturization of the magnetic disk drive, the height of the head assembly (namely, the thickness of a boss member) is restricted. For example, in the case of 2.5-inch magnetic disks, the height of the head assembly is demanded to be ½ inches or less (about 10 mm) in thickness. Therefore, it is necessary to extremely reduce the thickness of each arm plate from about 0.8 mm (conventional thickness) to about 0.4 mm. However, if such extremely thin arm plates are to be produced by aluminum die-casting, the arm plates would be warped or curved, failing to achieve the accurate positioning of the magnetic heads.

SUMMARY OF THE INVENTION

Accordingly, an object of the present invention is to provide an arm assembly meeting the increasingly higher demand for miniaturization and increased capacity in magnetic disk drives.

Another object of the present invention is to provide a voice coil motor comprising such an arm assembly.

Thus, the arm assembly according to the present invention comprises a rotatable boss member; three or more arm plates each formed from a thin, non-magnetic metal sheet and extending in parallel from one side of the boss member; a coil member fixed to the other side of the boss member such that the coil member is swingable in a magnetic gap; and a suspension member having a front end equipped with a recording/reproducing head and a rear end fixed to a free end of each arm plate; wherein pins projecting from upper and lower surfaces of the boss member are fitted into through-holes of an uppermost arm plate and a lowermost arm plate so that the uppermost and lowermost arm plates are strongly fixed to the boss member, and wherein at least one arm plate disposed between the uppermost and lowermost arm plates is integrally fixed to the boss member with a thermoplastic resin.

The voice coil motor according to the present invention comprises a magnetic circuit means and an arm assembly recited in claim 1, wherein the magnetic circuit means is constituted by a pair of yokes opposing each other, at least one permanent magnet attached to at least one of the yokes, and supports fixed to both yokes for defining a magnetic gap on a surface of the permanent magnet, and wherein the coil member of the arm assembly is swingable in the magnetic gap.

DETAILED DESCRIPTION OF THE INVENTION

[1] Structure of arm assembly

The arm assembly of the present invention is composed of a rotatable boss member, three or more arm plates each formed from a thin, non-magnetic metal sheet and extending in parallel from one side of the boss member, a coil member fixed to the other side of the boss member, and a suspension member fixed to a free end of each arm plate. Pins projecting from upper and lower surfaces of the boss member are fitted into through-holes of an uppermost arm plate and a lowermost arm plate so that the uppermost and lowermost arm plates are strongly fixed to the boss member. One or more arm plates disposed between the uppermost and lowermost arm plates are integrally fixed to the boss member with a thermoplastic resin.

In general, to increase the recording capacity of a magnetic disk drive, it is extremely important to arrange as many arm plates as possible in a predetermined height. For this purpose, each arm plate should be formed from a thin, non-magnetic metal sheet. Such thin, non-magnetic metal sheet preferably has a thickness of 0.5 mm or less, more preferably 0.4 mm or less, most preferably 0.1–0.2 ram. In a preferred embodiment, the arm plate is punched out in an elongated rectangular shape from a thin, non-magnetic stainless steel sheet having a thickness of about 0.1–0.2 mm, while simultaneously forming a suspension member-fixing hole and weight reduction holes.

Figure 1:
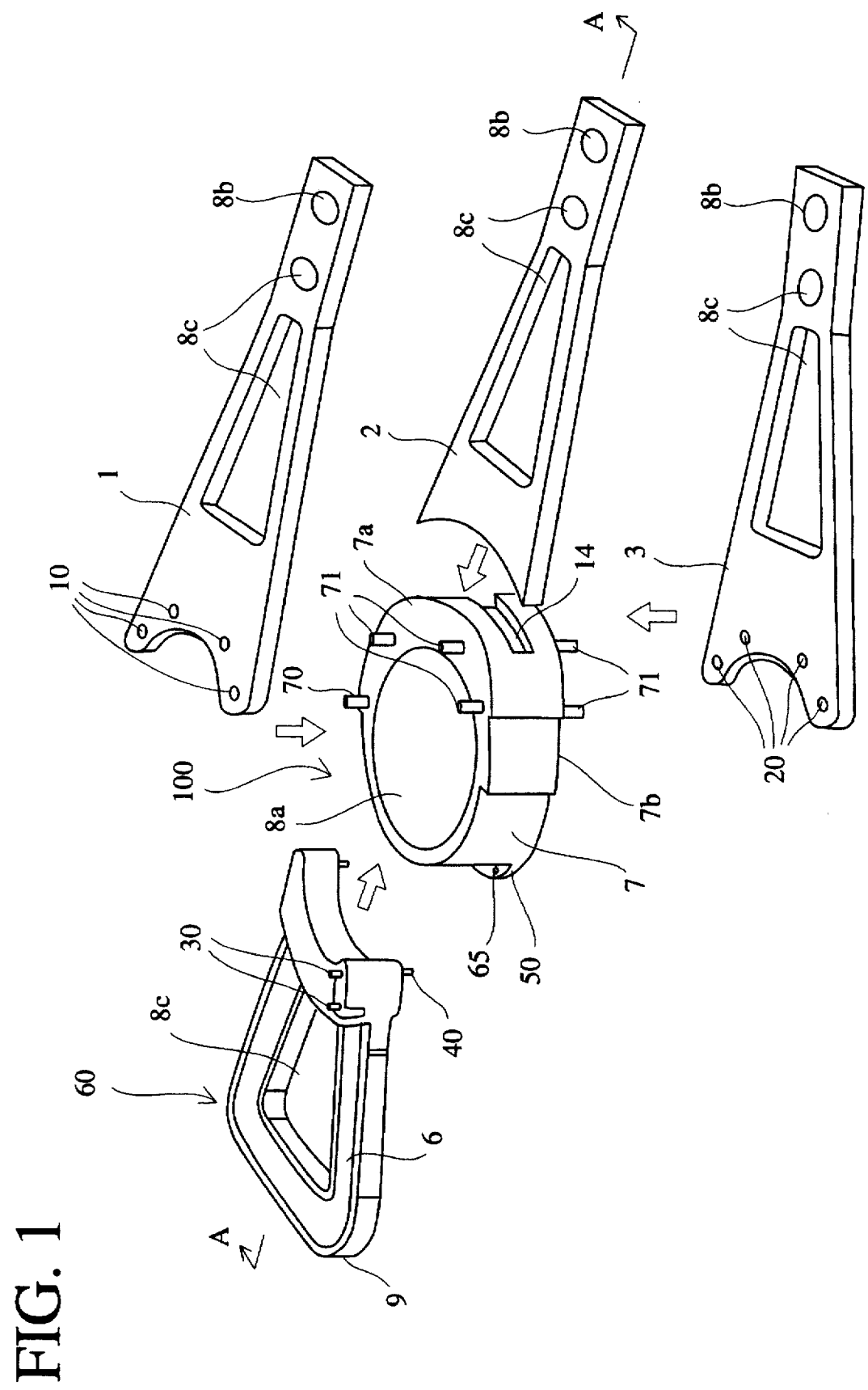
FIG. 1 is an exploded perspective view showing the arm assembly according to one embodiment of the present invention.
Figure 2:
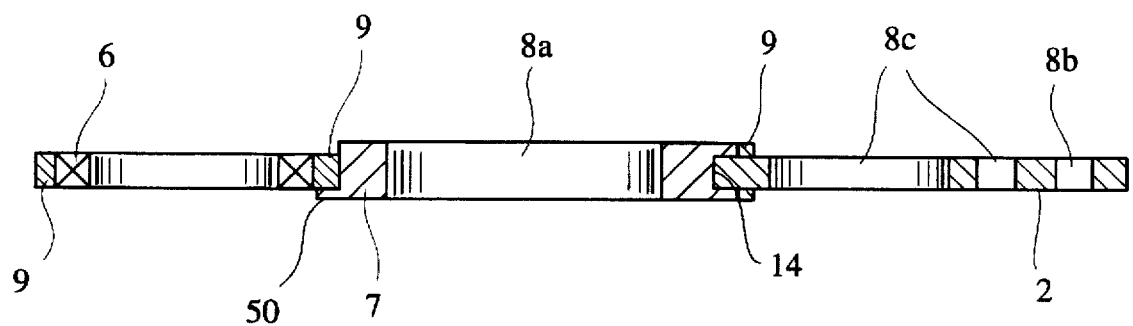
FIG. 2 is a cross-sectional view showing the boss member to which the coil member and the middle arm plate are fixed along the line A—A in FIG. 1.
Figure 8:
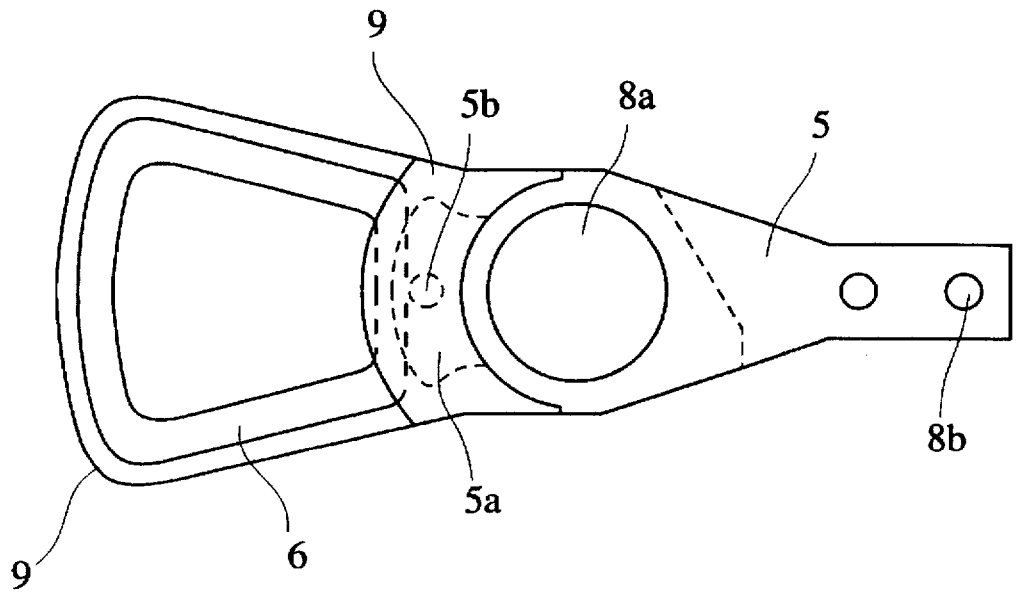
FIG. 8 is a plan view showing a conventional arm assembly when viewed from above.
Figure 9:
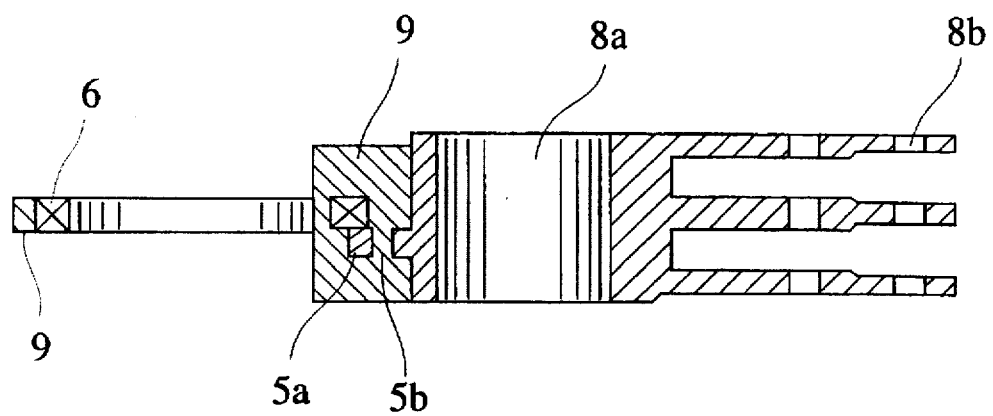
FIG. 9 is a vertical cross-sectional view showing the conventional arm assembly of FIG. 8.

FIGS. 1–3 show the arm assembly according to one embodiment of the present invention with the same reference numerals as those in FIGS. 8 and 9 assigned to parts identical with those in FIGS. 8 and 9. In this embodiment, the arm assembly 100 comprises a rotatable boss member 7 having four pins 70, 71 and three arm plates 1, 2, 3. The boss member 7 may be formed integrally with pins 71 on both upper and lower surfaces 7a, 7b. The upper arm plate 1 is provided with four through-holes 10 into which a pin 70 and the three pins 71 all projecting from an upper surface 7a of the boss member 7 are inserted. The lower arm plate 3 is provided with four through-holes 20 into which the pin 70 and the three pins 71 all projecting from an lower surface 7b of the boss member 7 are inserted.

The non-magnetic metal for the arm plates 1, 2, 3 may be rolled aluminum alloys such as A6061P, A7075P, etc., rolled copper alloys such as Be—Cu alloys (C1720P, etc.) and phosphor bronze (C5210P, etc.), magnesium alloys such as MPI, etc., Be—Al alloys, austenitic stainless steel such as SUS304, etc., and these alloys may be used alone or in combination. Among them, austenitic stainless steel, A7075P, Be—Cu alloys and Be—Al alloys are preferable from the viewpoint of press-formability and rigidity.

In the preferred embodiment, the boss member 7 is formed of an aluminum alloy (for instance ADC12) by die casting, and the three pins 71 are formed of the same aluminum alloy (for instance ADC12) integrally with the boss member 7 in a single die casting process. The upper, middle and lower arm plates 1, 2, 3 may be formed from a thin austenitic stainless steel sheet (for instance SUS304, thickness: 0.16 mm), and a pin 70 may be formed of the same stainless steel (for instance SUS304).

Among the pins projecting from the upper and lower surfaces 7a, 7b of boss member 7, at least one is preferably made of non-magnetic stainless steel from the viewpoint of rigidity. At least one non-magnetic stainless steel pin member is fitted into at least one through-hole (not shown) opening to the upper and lower surfaces 7a, 7b of boss member 7, thereby forming at least one pin projecting from the upper and lower surfaces 7a, 7b.

The pins 70, 71 on the upper and lower surfaces 7a, 7b of the boss member 7 are inserted into the through-holes 10, 20 of the upper and lower arm plates 1, 3 and bonded together by ultrasonic welding, beam welding, adhesives, etc. so that the upper and lower arm plates 1, 3 are strongly fixed to the boss member 7.

At least one middle arm plate 2 disposed between the uppermost and lowermost arm plates 1, 3 is fixed to the boss member 7. The appropriate number of the middle arm plate 2 may be determined depending on the required thickness of the arm assembly and the required recording capacity of the magnetic disk. The middle arm plate 2 is fixed to a side wall of the boss member 7 with hold member 9 made of thermoplastic resin. The hold member 9 may be integrally formed by injection molding.

The thermoplastic resins used for the hold member 9 may be glass fiber-reinforced polyphenylene sulfide resins, polyamide resins, polyimide resins, polyamideimide resins, polyester resins such as polybutylene terephthalate, polybutylene naphthalate, etc. These thermoplastic resins are preferably heat-resistant resins.

The thermoplastic resins preferably have a Young's modulus of $8 \times 10^4$ kg/cm$^2$ or more (ASTM D-638), more preferably $13 \times 10^4$ kg/cm$^2$ or more. Particularly, it is preferable to use liquid crystal polymers (showing a liquid crystallinity in a molten state) such as liquid crystal polyesters (having rigid skeletons).

To improve mechanical strength without increasing a weight thereof, the above thermoplastic resins may contain, in addition to glass fibers, low-density fillers such as carbon fibers, talc, $SiO_2$, $Al_2O_3$, $TiO_2$, AlN, Al, etc. These fillers are preferably non-magnetic from the viewpoint of the swing controllability of the arm assembly. The specific gravity of the filler-reinforced thermoplastic resins should be less than 2.6 (specific gravity of conventional aluminum alloy), preferably less than 2.0. Accordingly, the amount of fillers added to the resins is preferably 10–50 weight %, more preferably 20–40 weight %. The above thermoplastic resins may also be used to integrally fix the coil member 60 to the boss member 7.

With this structure, the number of the arm plates can be arbitrarily changed only by modifying the design of the boss member 7, making it extremely easy to assemble the parts of the arm assembly 100. As a result, the arm assembly 100 can be provided with extremely thin and highly rigid arm plates 1, 2, 3 which are strongly fixed to the boss member 7. Such arm assembly 100 is suitable for a voice coil motor for use in magnetic disk drives which have become increasingly smaller in size and higher in capacity. Further, since each arm plate is constituted by a high-rigidity, thin, non-magnetic metal sheet, the arm plates 1, 2, 3 can have various rigidity distributions (Young's modulus distributions) and wide freedom of design.

The coil member 60 is composed of a hollow coil 6, a hold member 9, terminal pins 30 connected to lead wires (not shown), and pins 40. The coil member 60 is also integrally fixed to a side wall of the boss member 7 with a hold member 9 made of the same thermoplastic resins as described above, as shown in FIG. 6.

Figure 3A:
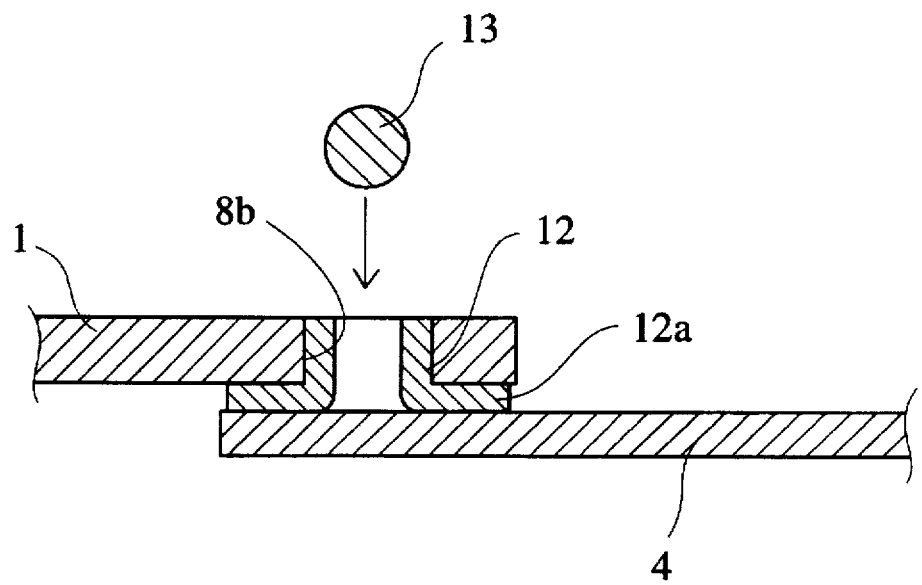
FIG. 3(a) is an enlarged cross-sectional view of a flat free end portion of an arm plate to which a suspension member is fixed.

A suspension member 4 provided with a recording/reproducing head (not shown) at one end is preferably fixed to the free end of each arm plate 1 via an annular projection 12 whose flange 12a is fixed to the rear end of the suspension member 4 as shown in FIGS. 3(a) and (b). To maintain the rigidity of the free end portion of the arm plate 1, it may have a stepwise cross section. The annular projection 12 is fitted into a through-hole 8b of each arm plate 1 and expanded so that the annular projection 12 is integrally fixed to the through-hole 8b. For this purpose, a hard ball 13 (for example, steel ball) having a slightly larger diameter than an inner diameter of the annular projection 12 is preferably pressed into the annular projection 12. Since the annular projection 12 is expanded, the annular projection 12 is strongly fixed to the hole 8b of the arm plate 7. Incidentally, instead of the annular projection 12, the rear end of the suspension member 4 may be provided with a burred portion having a similar annular shape.

Figure 3B:
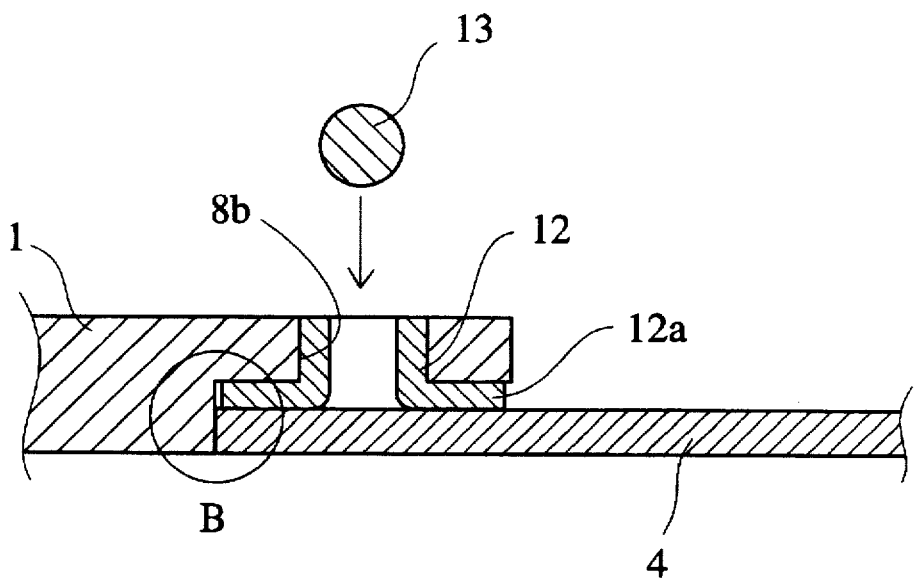
FIG. 3(b) is an enlarged cross-sectional view of a stepped free end portion of an arm plate to which a suspension member is fixed.

FIG. 3(b) shows an example of a suspension member 4 fixed to a stepped tip end portion B of the arm plate 1 to obtain extremely improved rigidity at a fixing position of the arm plate 1 and the suspension member 4.

[2] Production of arm assembly

At least one groove 14 extending in perpendicular to an axis of the boss member 7 is formed on a side wall of the boss member 7 in perpendicular to the axis of the boss member 7 as shown in FIG. 1. A rear end of the middle arm plate 2 is then inserted into the groove 14 as shown in FIG. 2 (A—A cross section of FIG. 1). After the boss member 7 fixedly provided with the middle arm plate 2 is combined with the upper and lower arm plates 1, 3 each having holes 8c for weight reduction and a through-hole 8b for mounting a suspension member in an injection molding die at a predetermined position, a molten resin is introduced into a cavity of the injection molding die to produce a hold member 9 on a side wall of the boss member 7. By this injection molding process, the middle arm plate 2 is fixed to the boss member 7.

The coil member 60 is produced by the following steps: For example, a hollow coil is produced by winding a wire having a self-melting coating around a core wire at a predetermined number of turns to form a flat multi-layer coil and then flowing current through this coil to generate heat for integrally fusing the wire. Next, the resulting coil 6 having terminal pins 30 to which lead wires (not shown) are soldered is placed in an injection molding die, and a molten thermoplastic resin such as a glass fiber-reinforced polyphenylene sulfide resin is injected into the die. After solidification, the resulting coil member 60 is taken out of the die. After applying an adhesive to the pins 40 of the coil member 60, the pins 40 are inserted into the through-hole 65 in a coil-fixing portion 50 of the boss member 7, thereby strongly fixing the coil member 60 to the boss member 7.

A flange 12a of an annular projection 12 is fixed to the rear end of the suspension member 4 provided with a recording/reproducing head (not shown) at one end as shown in FIGS. 3(a) and (b). The annular projection 12 fixed to the suspension member 4 is fitted into a through-hole 8b provided at the free end of each arm plate 1 to fix the suspension member 4 to the free end of each arm plate 1. The annular projection 12 received in the hole 8b is then pressed to expand by forcibly inserting a hard ball 13 having a slightly larger diameter than an inner diameter of the annular projection 12, so that the annular projection 12 is integrally fixed to the through-hole 8b.

Figure 4:
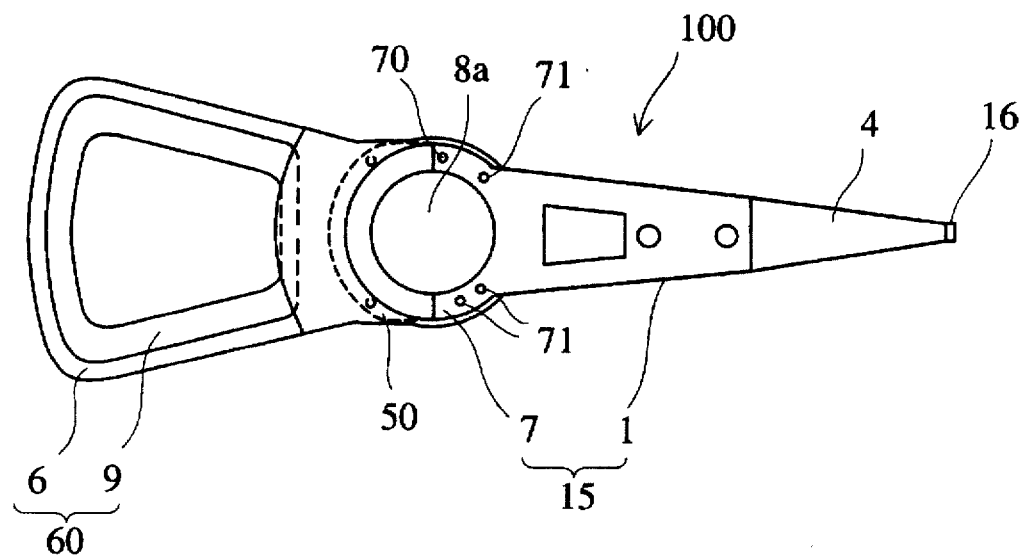
FIG. 4 is a plan view showing the arm assembly of one embodiment of the present invention when viewed from above.

Thus obtained is an arm assembly 100 comprising the boss member 7 having a rotation center as shown in FIG. 4 (plan view of the upper arm plate 1 viewed from above in FIG. 1) to which the arm plates 1–3 each constituted by a thin, non-magnetic metal sheet, the coil member 60 fixed to the other side of the boss member 7, and the suspension member 4 supporting a recording and reproducing head 16 at a tip end are integrally fixed.

Figure 6:
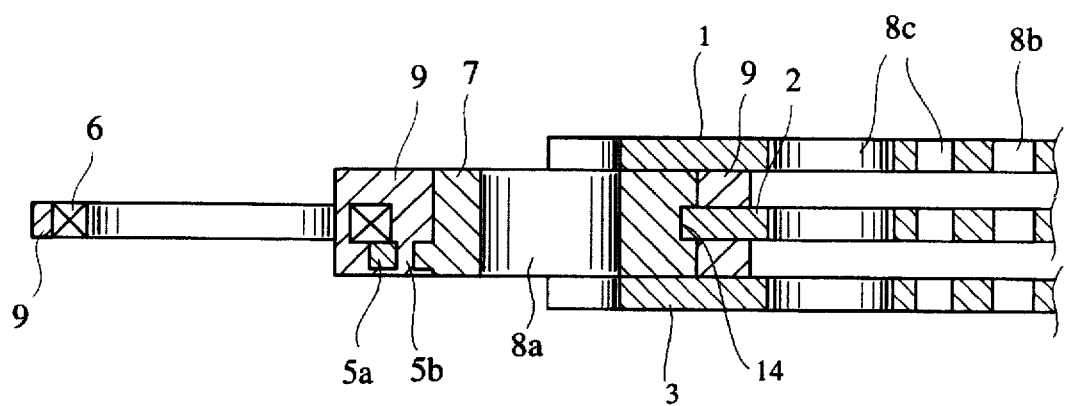
FIG. 6 is a cross-sectional view taken along the line B—B in FIG. 5.
Figure 5:
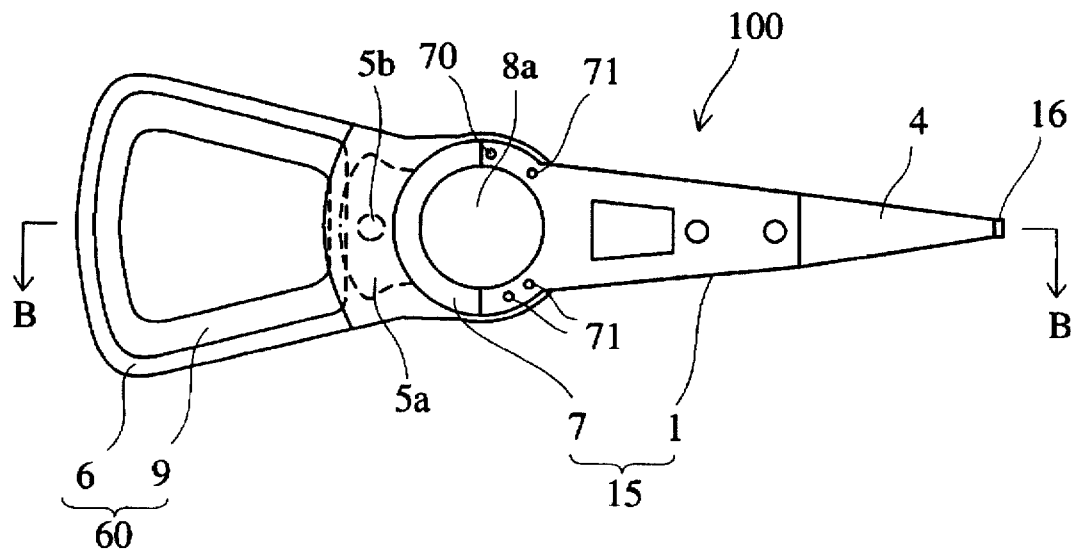
FIG. 5 is a plan view showing the arm assembly of another embodiment of the present invention when viewed from above.

FIG. 5 shows another example of an arm assembly 100 in which a coil member 60 is integrally fixed to a boss member 7 with a thermoplastic resin, and FIG. 6 is a B—B cross section of FIG. 5. The coil member 60 is integrally mounted to the boss member 7 via the hold member 9 made of a thermoplastic resin such as polyphenylene sulfide by injecting a molten resin into a cavity of an injection molding die in which the boss member 7 and the flat coil 6 are disposed at a predetermined position, and solidifying the injected product. The middle arm plate 2 is integrally fixed to the boss member 7 with a thermoplastic resin in the same manner as described above, with the upper arm plate 1 and the lower arm plate 3 fixed to the boss member 7 by pins 70, 71. Incidentally, these parts may be fixed by injection molding after disposing the middle arm plate 2, the boss member 7 and the coil member 60 in the cavity of the injection molding die at predetermined positions.

[3] Voice coil motor

Figure 7A:
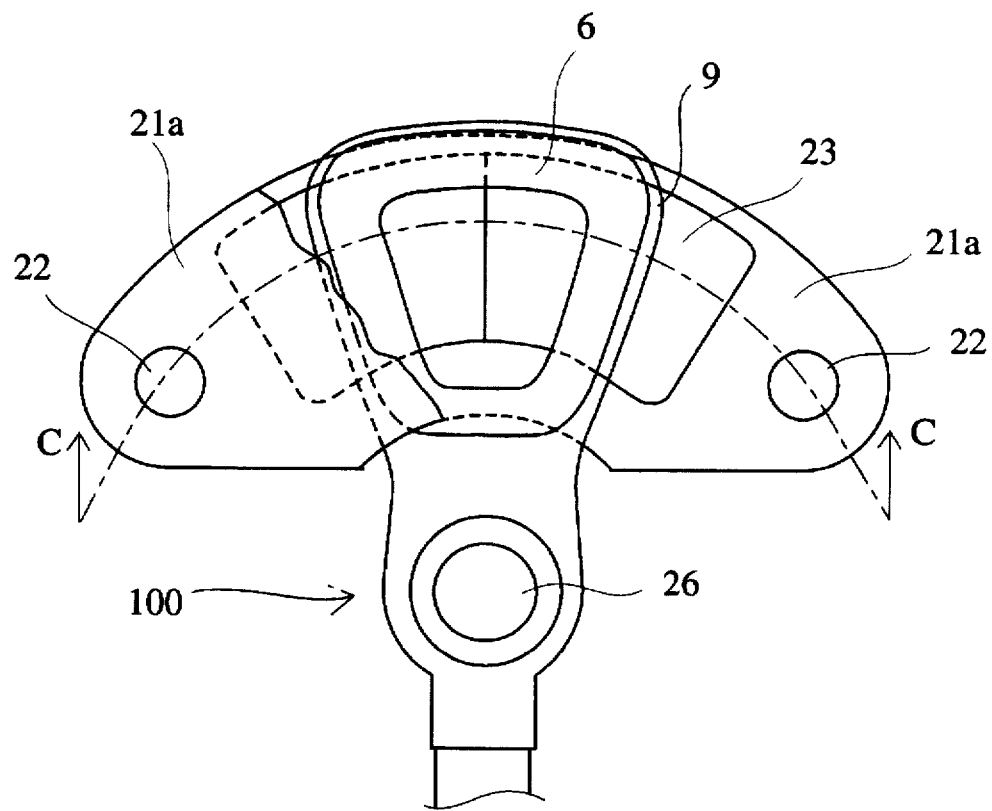
FIG. 7(a) is a partially broken view showing the voice coil motor of the present invention.
Figure 7B:
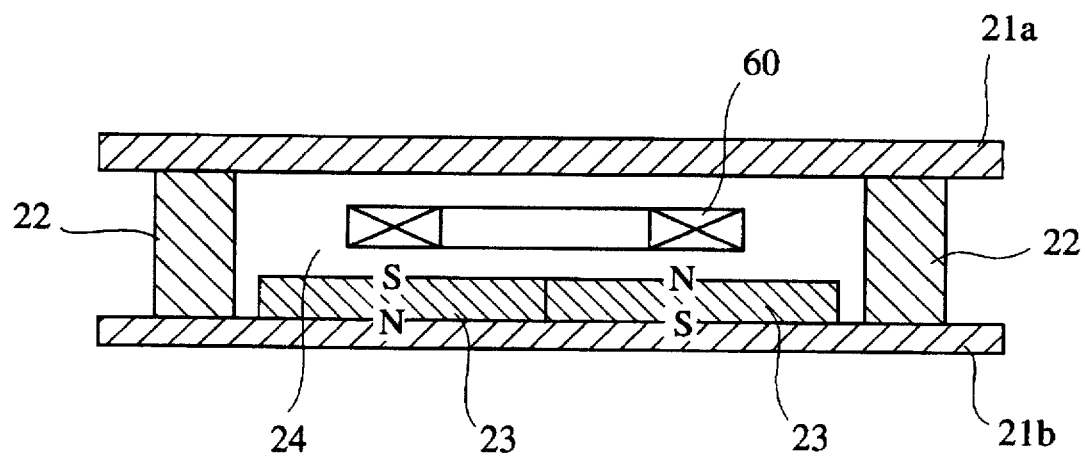
FIG. 7(b) is a cross-sectional view taken along the line C—C in FIG. 7(a)

The arm assembly 100 is fixed to a magnetic circuit means to provide a voice coil motor as shown in FIG. 7. The magnetic circuit means comprises a pair of yokes 21a, 21b made of a ferromagnetic material and opposing each other, permanent magnets 23 in a nearly trapezoidal, flat shape, and supports 22 mounted to the end portions of both yokes 21a, 21b for defining a magnetic gap 24 therebetween. In this embodiment, the two permanent magnets 23, 23 each having magnetic poles in a thickness direction are attached to an inner surface of a lower yoke 21b such that opposite magnetic poles (N and S) appear on the surfaces of the permanent magnets 23, 23 facing the magnetic gap 24.

The arm assembly 100 is fixed to casing (not shown) such that the flat coil 6 is swingable in the magnetic gap 24. Therefore, when an operation signal is supplied to the flat coil 6, a magnetic force generated from the flat coil 6 according to Fleming's left hand rule functions as an attraction force or a repulsion force to the permanent magnets 23, so that the arm assembly 100 is rotated around the shaft 26. As a result, the magnetic head is positioned on a desired magnetic track of a magnetic disk. The direction of the rotation can be changed by inverting the direction of current applied to the flat coil 6.

In the embodiment of FIG. 7 (b) the permanent magnets 23, 23 are bonded to the lower yoke 21b, but the upper yoke 21a may also have a permanent magnet depending on the magnetic properties required for the voice coil motor. If permanent magnets are bonded to the upper yoke 21a in the same number and the same size as those of the permanent magnets bonded to the lower yoke 21b in such a manner that the opposite magnetic poles of upper and lower permanent magnets are facing each other via a magnetic gap 24, a magnetic flux density in the gap 24 preferably increases.

The arm assembly and the voice coil motor according to the present invention have the following advantages:

(1) Since each arm plate is formed from a rigid, thin, non-magnetic metal sheet, the arm assembly is extremely thin with sufficient mechanical strength, providing a head carriage with a high resonance frequency.

(2) Since a plurality of arm plates can be strongly fixed to the boss member at a low cost, demands for miniaturization and increase in a capacity of magnetic disk drives can be met.

(3) Since the number of the arm plates can easily be changed in a range of 3 or more only by the modification of the design of the boss member, the cost of the arm assembly can drastically be reduced.

(4) Since the arm plates can be constituted by one or more types of rigid, thin, non-magnetic metal sheets, the arm plates having various rigidity distributions (Young's modulus distributions) can be produced with wide freedom of design.

What is claimed is:

1. An arm assembly comprising:

a rotatable boss member having upper and lower surfaces and first and second sides, with pins projecting from the upper and lower surfaces;

upper, lower and middle arm plates each formed from a thin, non-magnetic metal sheet, each having a free end and each extending from the first side of said boss member, the upper and lower arm plates having through-holes extending therethrough such that the pins, which project from the upper and lower surfaces of the boss member, respectively fit in the through-holes of the upper and lower arm plates to fix the upper and lower plates to the boss member, the middle arm plate being positioned between and parallel to the upper and lower arm plates and being fixed to said boss member with a thermoplastic resin;

a coil member fixed to the second side of said boss member such that the coil member is swingable in a magnetic gap; and a plurality of suspension members, each having a front end equipped with a recording/reproducing head and a rear end fixed to the free end of one of the upper, lower and middle arm plates.

2. The arm assembly according to claim 1, wherein said coil member is integrally fixed to said boss member with a thermoplastic resin.

3. A voice coil motor comprising:

a rotatable boss member having upper and lower surfaces and first and second sides, with pins projecting from the upper and lower surfaces;

upper, lower and middle arm plates each formed from a thin, non-magnetic metal sheet, each having a free end and each extending from the first side of said boss member, the upper and lower arm plates having through-holes extending therethrough such that the pins, which project from the upper and lower surfaces of the boss member, respectively fit in the through-holes of the upper and lower arm plates to fix the upper and lower plates to the boss member, the middle arm plate being positioned between and parallel to the upper and lower arm plates and being fixed to said boss member with a thermoplastic resin;

a coil member fixed to the second side of said boss member;

a plurality of suspension members, each having a front end equipped with a recording/reproducing head and a rear end fixed to the free end of one of the upper, lower and middle arm plates; and a magnetic circuit having
an upper yoke having a lower surface;
a lower yoke having an upper surface such that the upper surface of the lower yoke opposes the lower surface of the upper yoke;
at least one lower permanent magnet having upper and lower surfaces, the lower surface of the at least one lower permanent magnet being attached to the upper surface of the lower yoke; and
supports fixed to the upper and lower yokes for separating the upper and lower yokes to define a magnetic gap between the upper surface of the at least one lower permanent magnet and the lower surface of the upper yoke, the coil member being swingable in the magnetic gap.

4. The voice coil motor according to claim 3, wherein said coil member is integrally fixed to said boss member with a thermoplastic resin.

5. A voice coil motor according to claim 3, wherein the magnetic circuit has at least one upper permanent magnet having upper and lower surfaces with the upper surface of the at least one permanent magnet being attached to the lower surface of the upper yoke such that the magnetic gap is defined between the lower surface of the at least one upper permanent magnet and the upper surface of the at least one lower permanent magnet.

6. The voice coil motor according to claim 5, wherein the coil member is integrally fixed to the boss member with a thermoplastic resin.

7. The arm assembly according to claim 1, wherein a plurality of middle arm plates are provided between the upper and lower arm plates.

8. The arm assembly according to claim 1, wherein the arm plates are formed of a non-metallic material selected from the group consisting of an aluminum alloy, a copper alloy, a Be—Al alloy, and a stainless steel.

9. The arm assembly according to claim 1, wherein the thermoplastic resin is selected from the group consisting of glass, fiber-reinforced polyphenylene sulfide resins, polyamide resins, polyimide resins, polyamideimide resins, and polyester resins.

10. The arm assembly according to claim 1, wherein the thermoplastic resin has a Young's modulus of at least $8 \times 10^4$ kg/cm$^2$.

11. The arm assembly according to claim 1, wherein the thermoplastic resin has a filler added thereto and the filler is selected from the group consisting of glass fiber, carbon fiber, talc, $SiO_2$, $Al_2O_3$, $TiO_2$, AlN and Al.

12. An arm assembly for a magnetic disk drive, comprising:

a rotatable boss member having an upper, lower and side surfaces with pins extending from the upper and lower surfaces;

upper, lower and middle arm plates, each arm plate having a recording/reproducing head attached thereto, the upper and lower arm plates having holes therein, the pins, which extend from the upper and lower surfaces of the rotatable boss member, being fitted respectively in the holes in the upper and lower arm plates; and a resin attaching the middle arm plate to the side surface of the rotatable boss member.

* * * * *